US005825413A

United States Patent [19]

Mullis

[11] Patent Number: 5,825,413

[45] Date of Patent: Oct. 20, 1998

[54] INFRARED SURVEILLANCE SYSTEM WITH CONTROLLED VIDEO RECORDING

[75] Inventor: Phillip Russell Mullis, Indianapolis, Ind.

[73] Assignee: Thomson Consumer Electronics, Inc., Indianapolis, Ind.

[21] Appl. No.: 551,466

[22] Filed: Nov. 1, 1995

[51] Int. Cl.$^{6}$ .......... H04N 7/18

[52] U.S. Cl. .......... 348/155; 348/213; 348/211

[58] Field of Search .......... 348/211, 212, 348/213, 214, 154, 155; 359/143, 144, 148, 152, 169, 170, 172; 340/567; 250/342; H04N 7/18

[56] References Cited

U.S. PATENT DOCUMENTS

| | | | |
|---|---|---|---|
| 3,729,581 | 4/1973 | Anderson . | |
| 4,001,881 | 1/1977 | Folsom . | |
| 4,736,097 | 4/1988 | Philipp | 348/155 |
| 4,746,910 | 5/1988 | Pfister et al. | 340/567 |
| 4,896,039 | 1/1990 | Fraden | 250/342 |
| 5,266,807 | 11/1993 | Neiger . | |
| 5,327,233 | 7/1994 | Choi . | |
| 5,386,210 | 1/1995 | Lee | 340/567 |
| 5,400,246 | 3/1995 | Wilson et al. . | |
| 5,428,388 | 6/1995 | Von Bauer et al. | 348/155 |
| 5,455,561 | 10/1995 | Brown . | |
| 5,473,368 | 12/1995 | Hart | 348/155 |
| 5,495,288 | 2/1996 | Broady et al. | 348/155 |
| 5,557,421 | 9/1996 | Kurita . | |
| 5,565,844 | 10/1996 | Bedrosian | 340/567 |
| 5,570,085 | 10/1996 | Bertsch . | |
| 5,583,654 | 12/1996 | Oguro . | |
| 5,657,076 | 8/1997 | Tapp | 348/154 |

FOREIGN PATENT DOCUMENTS

| | | |
|---|---|---|
| 0113069 | 11/1984 | European Pat. Off. . |
| 4137560C1 | 2/1993 | Germany . |
| G9409202.8 | 9/1994 | Germany . |
| 1094787 | 4/1989 | Japan . |
| 2176859 | 7/1990 | Japan . |
| 3154095 | 7/1991 | Japan . |

OTHER PUBLICATIONS

IBM vol. 18, No. 7, pp. 2280–2281 Dec.1975.
Copy of EPO search report dated Mar. 25 1997.
Copending application serial No. 08/551467 (not provided).

*Primary Examiner*—Brian Casler
*Assistant Examiner*—LuAnne P. Din
*Attorney, Agent, or Firm*—Joseph S. Tripoli; Joseph J. Laks; Francis A. Davenport

[57] ABSTRACT

A surveillance system comprises an infrared motion detector which generates a signal indicative of detected motion. An infrared signal reflecting surface directs an incident infrared signal to the infrared motion detector. A generator generates an infrared remote control encoded data responsive to the signal indicative of detected motion. An infrared emitter is coupled to the generator for modulation by the infrared remote control encoded data. A modulated infrared signal from the infrared emitter is directed to the infrared signal reflecting surface for transmission. In the surveillance system described, battery powered operating time is extended by powering only the motion detector during periods of inactivity. Recording media usage is conserved by only recording periods of detected motion and may be further conserved by recording only predetermined frames.

21 Claims, 5 Drawing Sheets

FIG. 5
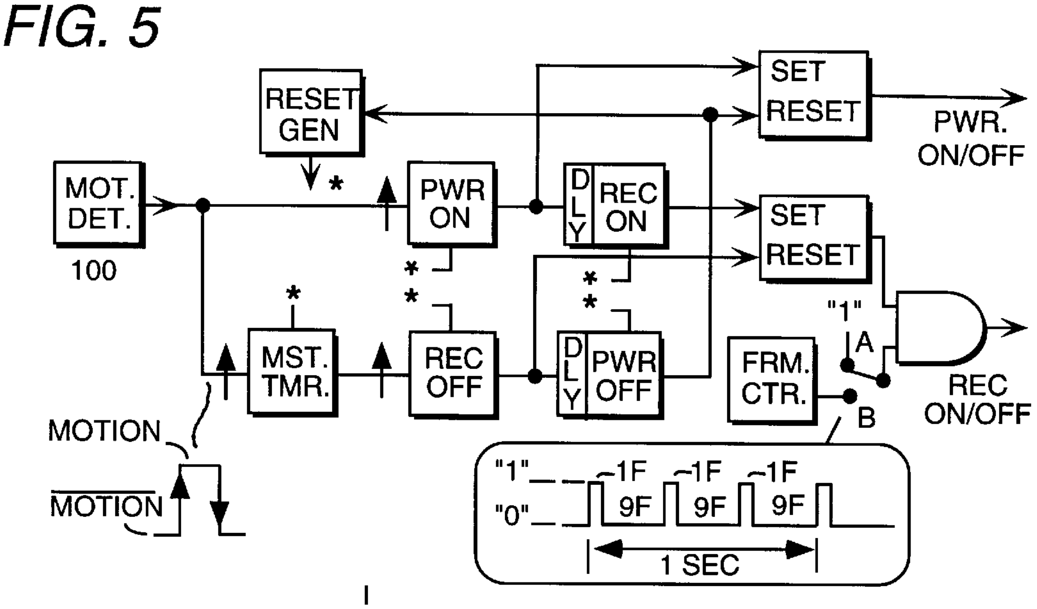
FIG. 6B
FIG. 6C
FIG. 6D
FIG. 6E
FIG. 6F
FIG. 6G
FIG. 6H
FIG. 6I
FIG. 6J
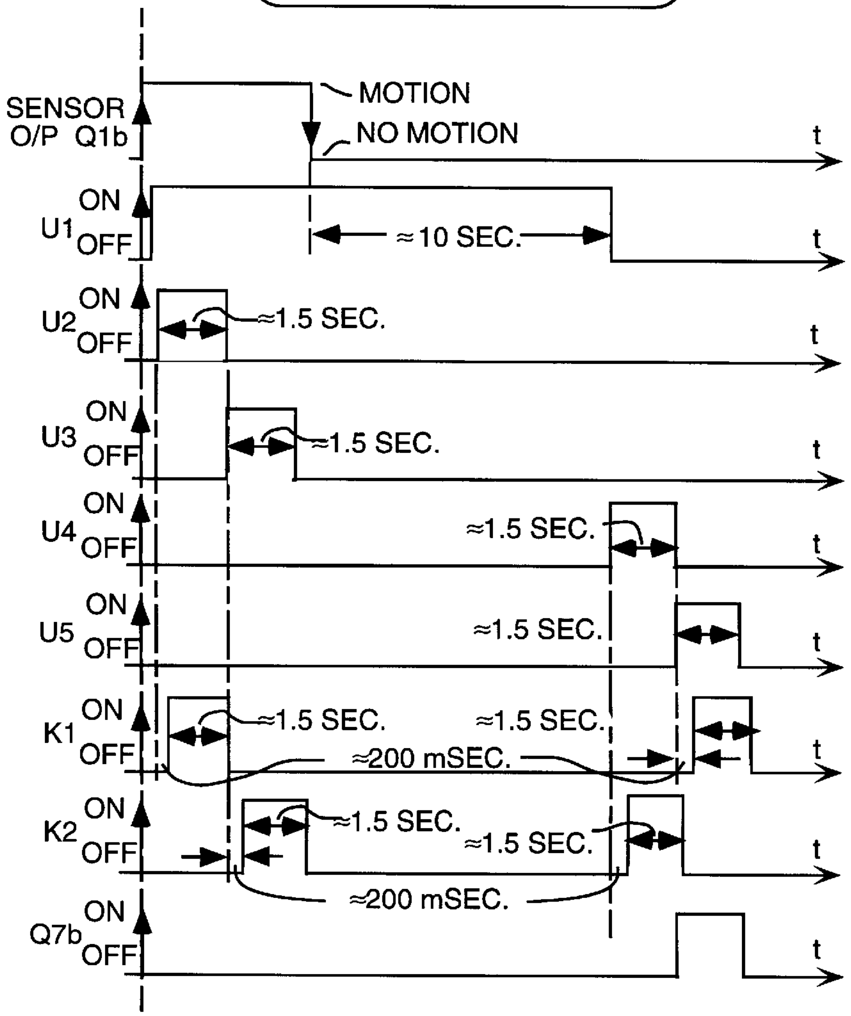

INFRARED SURVEILLANCE SYSTEM WITH CONTROLLED VIDEO RECORDING

BACKGROUND OF THE INVENTION:

Various methods of motion detection are known, for example, detectors may be active or passive. An active type detector may illuminate an area and detect motion by monitoring for any resulting disturbance of the illumination. Such systems may employ radio frequency emissions, infrared illumination or ultrasonic acoustic fields. Motion may be detected by reflection effects or by Doppler type shifts. Clearly an active type detector necessitates a powered illumination source which when added to detector power dissipation, may limit battery operating time when AC power is unavailable. Passive detection may employ a powered detector but does not provide illumination of an area, instead it relies on an object's own emissions, environmental disturbance, or reflection of prevailing illumination to provide a detectable presence signal. Such systems may detect an object's infrared emission, acoustic pressure disturbance, or reflection of ambient incident illumination. Passive detection may be more suitable for battery powered operation.

A video camera may be considered a passive sensor, forming images of objects from reflected ambient illumination. However, the camera may represent a significant source of power dissipation. Furthermore the camera may only sense, or image, it's field of view, with the resulting video image requiring further processing to determine motion occurring therein. A video camera sensor also provides the opportunity for the imaged area to be viewed, or be recorded for subsequent viewing. However, the combined power dissipation of a video camera, video motion processing and video recording may severely limit operating times when battery powered.

A surveillance system is required for consumer use which utilizes, for example, a consumer video recording camera or camcorder, and motion detector and control unit. The system is preferably battery powered, and may provide surveillance for at least as long as the duration of recording medium.

SUMMARY OF THE INVENTION:

A surveillance system comprises an infrared motion detector generating a signal indicative of detected motion. An infrared signal reflecting surface directs an incident infrared signal to the infrared motion detector. A generator generates infrared remote control encoded data responsive to the signal indicative of detected motion. An infrared emitter is coupled to the generator for modulation by said infrared remote control encoded data. A modulated infrared signal from the infrared emitter is directed to the infrared signal reflecting surface for transmission.

BRIEF DESCRIPTION OF THE DRAWING:

FIG. 5 is a block diagram illustrating an inventive controller.

FIGS. 6B–J depict various advantageous pulse waveforms generated by the control circuitry of FIG. 6.

Figure 1A:
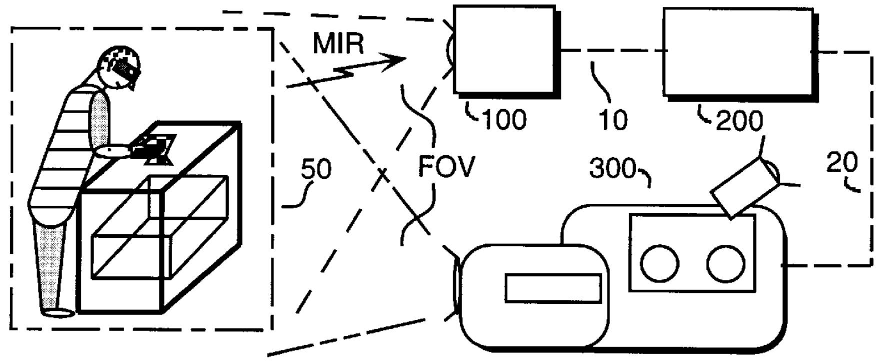
FIGS. 1A–1E illustrate various inventive embodiments of an advantageous surveillance system.

DETAILED DESCRIPTION:

FIG. 1A illustrates an inventive surveillance system comprising a motion detector 100, a control unit 200, and a video camera and recorder 300. A field of view FOV, is sensed by the camera and motion detector and is depicted as scene 50. The sensor/motion detector 100 is coupled to control unit 200 via connection 10 which may be facilitated by a cable, an optical fiber or wireless link, for example, either RF or IR Control unit 200 receives a signal indicative of detected motion from detector 100, and in response generates appropriate control signals for coupling via connection 20 to the video camera and recorder 300. Connection 20 may be facilitated as described for connection 10. Power sources for the respective elements have been omitted in the interest of drawing clarity, however, power may be derived from an AC supply if available or from batteries.

Figure 1B:
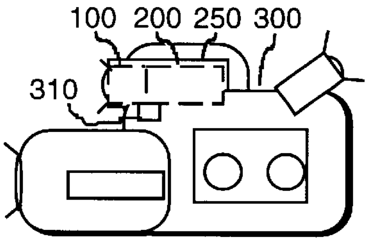

FIG. 1B illustrates a further inventive embodiment of a surveillance system where the motion detector 100 and control unit 200 are incorporated in a single detector controller 250 which is coupled via connector 310 directly to the body of the recording video camera 300. Coupling may be provided, for example, by means of a sliding connection akin to a "hot shoe"employed for a spot light or flash equipment. However, an IR coupling may provide a simpler connection method where the "hot shoe" provides only DC power. The embodiment of FIG. 1B may be advantageous for surveillance of small areas.

Figure 1C:
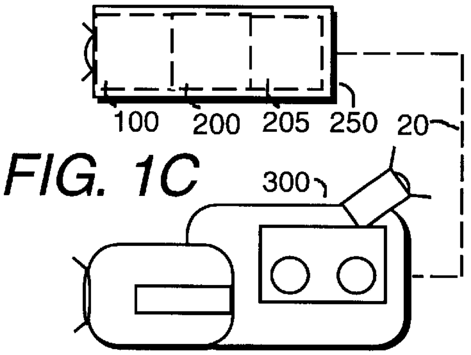

FIG. 1C illustrates another inventive surveillance system where motion detector 100 and control unit 200 are incorporated in a single unit 250. The combination of motion detector and control unit facilitates surveying a field of view which may be separated from recording camera 300. Camcorder 300 may be arranged to view nominally the same area as that surveyed by detector controller 250 but possibly from a differing viewing angle. The detector controller 250 communicates with the video camera and recorder 300 as described for FIG. 1A. However, in a further advantageous embodiment, detector controller 250 of FIG. 1C may generate remote control data coding which may be coupled to an infrared transmitter 206 to facilitate remote control of, for example, a consumer type camcorder 300.

Figure 1D:
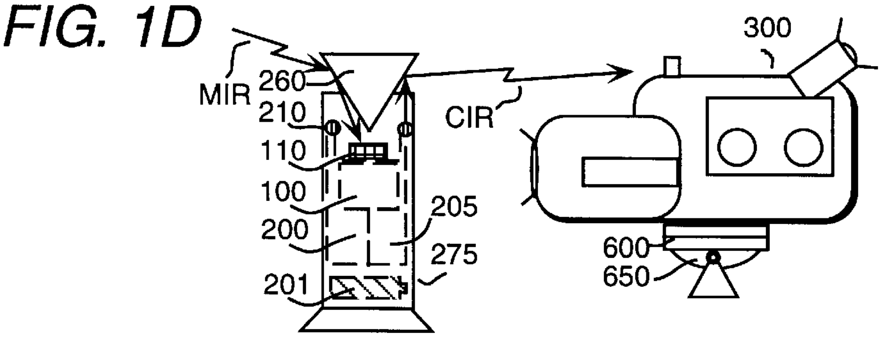

A further inventive embodiment is depicted in FIG. 1D, where the field of view detector controller 250 of FIG. 1C is replaced by detector transmitter 275. However, in a further advantageous embodiment, detector/transmitter 275 employs a reflecting and focusing device 260, shaped to receive and or transmit infrared emissions multi-directionally in a nominally circumferential shaped volume. Motion detector 110 is arranged to be located in a plane of focus such that moving infrared emissions MIR, within the circumferential volume may be detected. The multi-directional detector/transmitter 275 also generates remote control data coding in unit 205 for IR transmission as signal CIR to provide remote control. However, multi-directional detector transmitter 275 may employ a plurality of IR transmitting devices arranged to produce an multi-directional transmission pattern. The multi-directional detector transmitter 275 may be battery powered as depicted by battery 201. To conserve power consumption the plurality of IR transmitting devices may be sequentially energized to produce a multi sector stepping IR control beam CIR.

However, the rate at which the transmitting devices are sequentially energized must be slower than the time required to transmit a remote control signal. In addition, recording cameras often employ latching control systems where a first command establishes the desired mode and a second occurrence of the command terminates the mode. Hence the possibility of double triggering the remote recording camera may be avoided by arranging that the control logic within the remote recording camera ignores power on and record commands occurring within a period of, for example, one to two seconds.

Figure 1E:
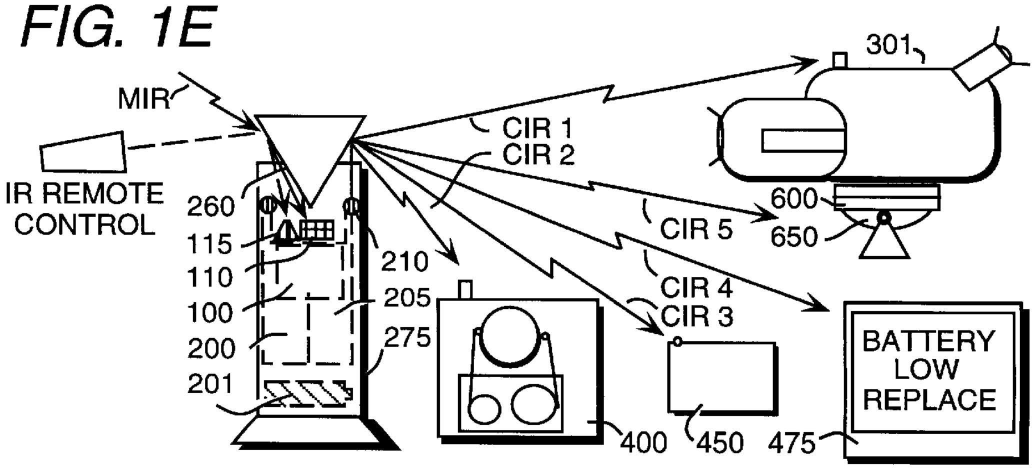

In FIG. 1E, the multi-directional detector transmitter 275 of FIG. 1D is depicted with separate infrared transmission signals having exemplary control codes CIR 1, CIR 2, CIR 3, CIR 4 and CIR 5. The separately addressed or coded infrared transmission signals may be generated responsive to detected motion and provide individual control of, for example, video camera 301, video recorder 400, a remotely controlled device 450, or receiver 475. The remotely controlled device may provide, for example, a lamp controller to illuminate the field of view, an audible announcement, an automatic telephone dialer and a remote indication of detected motion. Separately addressed or coded infrared transmission signals may be employed to report the operational status of the detector transmitter. For example, battery status may be communicated by, user demand or responsive to battery state, to trigger generation of a viewfinder warning display on the field of view camera 300 or 301. Similarly the detector transmitter may generate a status display message triggering signal directed to a specific television receiver 475. For example, the television receiver may be preprogrammed with stored warning or status messages which relate to the detector transmitter. These messages may be triggered by an appropriately coded IR signal CIR 4, generated and transmitted by the detector transmitter. As previously described, IR remote control data may be modulated for RF transmission to permit greater separation between the detector transmitter and the receiving device.

The multi-directional properties of the detector transmitter may be advantageously utilized to facilitate user remote control of the detector transmitter by means of a hand held IR remote control. An IR remote control receiver 115 permits the user to turn the detector transmitter on or off, determine battery status and over ride motion detection to enable camera and recorder testing and setup. To avoid spurious operation of receiver 115, the receiver output data may be gated or inhibited during transmission periods of control signals CIR 1–5. To prevent unauthorized tampering or disablement the detector transmitter may employ a device specific password which must be entered by the user and transmitted via the remote controller.

Figure 2A:
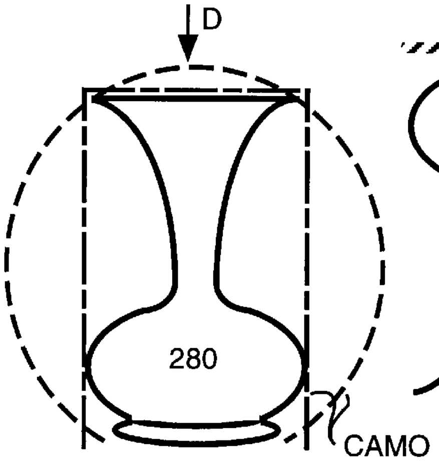
FIGS. 2A–2E illustrate various advantageous embodiments which provide substantially multi-directional surveillance and control capability.

In a further inventive embodiment the multi-directional reflecting and focusing device 260, shown in FIG. 1D and 1E, is replaced with an advantageous horn reflector and focusing dish. FIG. 2A is a side view of an inventive multidirectional detector/transmitter 280 advantageously employing for example, four parabolically shaped reflectors joined at each edge to form a vase like structure. Clearly a greater number of reflecting facet surfaces may be selected. The horn may be formed as a parabolically shaped cone, however the actual surface shape selected may represent a choice between manufacturing simplicity and an aesthetic appearance. The horn reflector may be formed by molding, for example, a plastic material. Similarly a suitable metal may be formed or spun to provide the required parabolic cone shape. The outer surface of the horn must be finished to provide a surface capable of reflecting IR radiation. For example, a plastic horn may be metal coated to produce a reflecting surface. The bottom, or lower end of the horn may be closed to provide containment of, for example, water and possibly flowers.

Figure 2B:
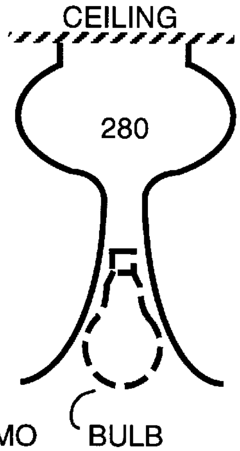

FIG. 2B illustrates an alternative form of inventive multi-directional detector/transmitter 280, which may be advantageously employed as a dummy ceiling mounted fan or light fixture. Since incandescent lamps output approximately 80% of their input power as heat or IR, use of this dummy light fixture may be limited to lamps with low IR output, for example, fluorescent. The light fixture may be activated by means of a manual switch or by sensed motion. The illuminated lamp may also provide a deterrent effect, and in addition provide a source of illumination for the imaging field of view.

Figure 2C:
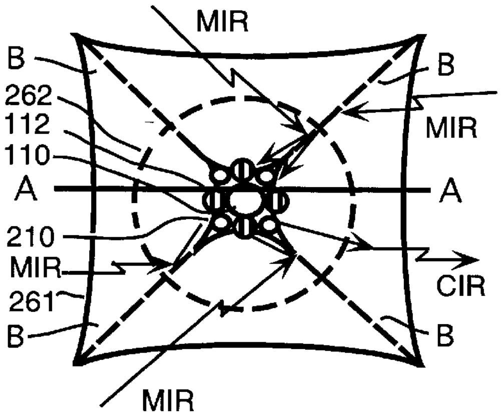

FIG. 2C is an enlarged, top down view in the direction indicated by arrow D in FIG. 2A. FIG. 2C illustrates an exemplary four facet horn reflector 261, where each facet may be considered a part of a parabolic surface having a single point of focus. Each parabolic surface is illustrated joined at each edge, as indicated by broken lines B. A focusing dish is depicted by broken circle 262 which is positioned to be essentially coaxial with a central axis of the horn. An infrared motion detector 110 is positioned at the base of the horn on the exterior surface. An alternative detector configuration is depicted by sensors 112 which replace the single, centrally positioned detector 110. Each sensor112 is positioned to detect incident infrared emissions, MIR, reflected by its adjacent reflecting surface. Thus it is possible to determine the general direction of the infrared emission, and in exemplary FIG. 2C, the direction may be discerned generally within the quadrantal reception area of each horn facet. Each sensor 112 generates a uniquely identified detected motion signal which is coded for transmission to a remotely located device. An exemplary remotely located device may include a remotely controlled video camera mounting having a horizontal panning unit 600 and tilting unit 650 as depicted in FIG. 1D and 1E. Thus the pan 600 and tilt 650 camera mounting may be remotely aimed in the direction of the detected motion enabling the video camera to image the motion source. A further exemplary remotely located device may provide remote indication of the detected motion direction. Infrared transmitting devices 210, for example LEDs may be positioned about detector 110.

Figure 2D:
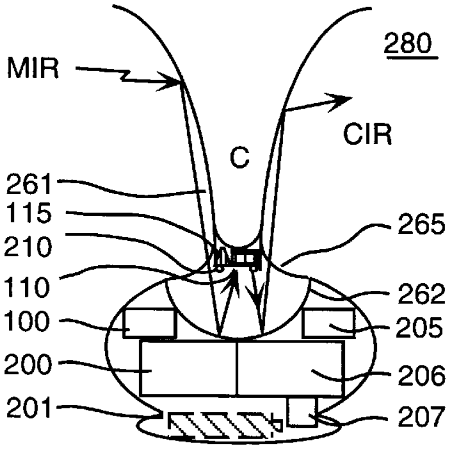
Figure 2E:
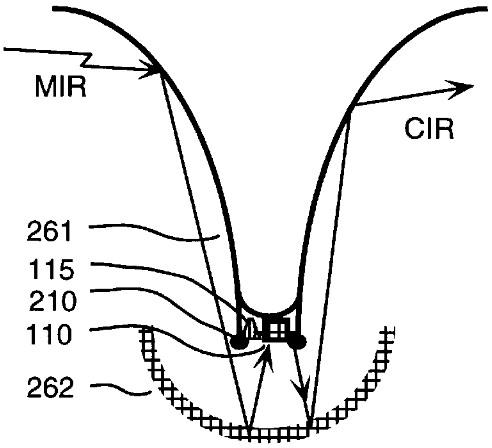

FIG. 2D is a sectional view at section at line A/A of FIG. 2C, passing from top to bottom through horn reflector 261, focus dish 262, motion sensor 110, IR remote control receiver 115, control unit 200 including control logic 207, control code generator 205, transmitter 206 and battery power source 201.

Focusing dish 262 may be parabolically shaped for collecting moving infrared emission MIR reflected by horn reflectors 261. Dish 262 focuses moving infrared emissions onto motion sensor 110. Since each facet of horn reflector 261 may receive infrared emissions MIR, over a horizontal spread of nominally 90 degrees, four reflectors may provide substantially multi-directional or 360 degrees of horizontal coverage sensed by a single sensor 110. Horn reflector 261 may receive emissions MIR emanating from a donut shaped circular volume about horn 261.

Infrared transmitting devices 210 are located at the base of horn 261 adjacent to motion sensor 110. This positioning allows the IR transmitters 210 to radiate in a nominally 360degree pattern about detector transmitter 275. Thus horn 261 provides multi-directional reception of moving object emissions and in addition permits multi-directional transmission of coded IR control data for reception at one or more equipment locations. The multi-directional motion detection properties of horn 261 and detector 100 may be coupled to an RF transmission system for coupling control data to remotely located equipment. Such an RF transmission system may operate in the region of 928–960MHz where the transmission carrier, or carriers, may be advantageously modulated by the coded control data stream employed for IR transmission. Such IR control code usage may simplify an RF system since IR coding and decoding integrated circuits are readily available. A transmitting antenna may comprise several turns of wire wound to form a coiled structure, for example, around the base of detector/transmitter 280. Similarly a metallic coating on the outer surface of horn 261 may be utilized as a transmitting antenna. Radio frequency control data may be received by a receiver which may be directly coupled to the camera recorder, or the receiver may couple via an IR control input on the camcorder if IR control data modulation is employed. The use of RF transmission for control data communication facilitates greater separation between the detector transmitter and the camcorder than can be achieved with IR transmission. In addition an RF control data link may be advantageous where obstructions to line of sight communication may preclude IR transmission.

Detector transmitter 280 may be advantageously packaged to disguise the operational purpose. For example, the horn shaped reflector 261 may be utilized to provide an inner volume capable of containing water and flowers, thus appearing as a flower vase. Detector transmitter 280 may be camouflaged to appear as, for example, a beverage can, open container of liquid, globe or beach ball. The horn structure and base electronics may be placed in a cylindrical or spherical sleeve, depicted in broken outline CAMO in FIG. 2A. Detector transmitter 280 may be inverted and formed to represent a table lamp, pendant lamp, ceiling mounted fan or lamp, as depicted in FIG. 2B. A pendant or ceiling mounted lamp disguise provides an elevated position which offers enhanced detection range with reduced obscuration of IR emissions. Detector transmitter 280 may be packaged to appear as almost any innocuous package shape. However, the transmission of both long and short wavelength infrared transmission must not be compromised by the camouflage packaging.

FIG. 2D is an enlarged view through horn reflector 261, focus dish 262, IR remote control receiver 115 and motion sensor 110, at line A/A. A moving infrared emission MIR is illustrated reflected by a facet of horn reflector 261. Infrared emission MIR is directed to reflecting dish 262 which focuses the signal on to IR sensor 110. The reflecting surface of dish 262 may be discontinuous, as depicted by the pattern in FIG. 2D. The reflecting surface discontinuities are such that moving IR images or emissions from horn reflector 261 are intermittently reflected to sensor 110 thus simplifying motion detection. A discontinuous reflecting surface may be produced by an arrangement of painted patches, holes or surface deformations. Intermittent illumination of sensor 110 may also be produced by non-IR reflective striping or patterns on the reflecting surface of the horn or by an IR obscuring pattern formed on a camouflage packaging. Following motion detection, control commands are generated and coupled for transmission by IR transmitters 210. Reflecting dish 262 is covered by an infrared transparent cover 265 to prevent the ingress of dust which may degrade the reflecting capabilities of dish 262. The IR transparent cover permits reflected IR signal MIR to reach dish 262 and in addition allows IR control transmission CIR to be reflected by horn 261 for remote equipment control.

Figure 3A:
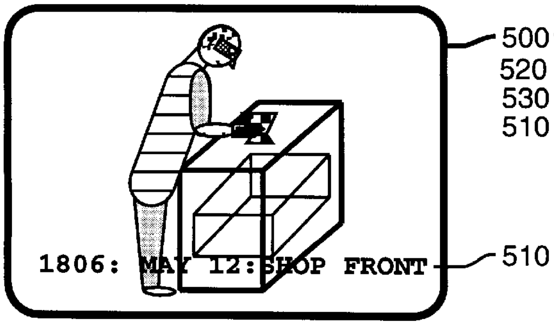
FIG. 3 depicts surveillance images advantageously marked for visual identification.

FIG. 3A illustrates a video frame generated by camera 300 and displayed on a video display screen 500. Alpha numeric data may be added invisibly to the video image signal to indicate date, time, camera designator or name of scene viewed. The alpha numeric data may be separate from the video image signal, and may be decoded and converted into a viewable display signal. The decoded alpha numeric data may be used to generate a video signal 510 capable of addition to the video image signal. However, the location of the display data within the viewed scene must be capable of variable positioning to avoid obscuration of scene detail.

Figure 3B:

FIG. 3B illustrates a video frame generated by camera 300 and displayed on a video display screen 500. Separated alpha numeric data is used to generate a viewable display image 510 which is inserted into the vertical blanking interval 530 of the video image signal. Thus alpha numeric data is permanently associated with the corresponding frame of the video image signal, and is readily viewable on a video display having a vertical deflection delay facility. By utilizing the vertical blanking interval of video image signal the alpha numeric data may be displayed without obscuration of the imaged video scene.

The operation of the inventive surveillance system illustrated in FIG. 1A is as follows. A motion detecting sensor 100 is positioned to view an area or location which is to be surveyed. Motion detecting sensor 100 may be of the active or passive type with the choice being determined to some extent by the surveillance location, detection range, and availability of power. For example, a shop or indoor sales environment, illustrated as scene 50 in FIG. 1A, may be suited to passive type infrared motion detection where radiant IR emissions from objects within the detector field of view are sensed. Frequently this type of detector relies on object motion to scan or provide intermittent stimulation of an IR detector. The detector generates an output signal responsive to detected motion, where the signal may represent a contact closure, or a voltage level. An external surveillance location for example, a driveway or parking lot may necessitate a greater separation between the detector 100 and the control unit 200, than that required for an indoor application. In such external surveillance conditions the object's speed may also necessitate greater separation between the detector and the camera recorder in order to allow time to initiate video imaging and recording. For example, an object moving with a speed of 30 miles per hour will travel 44 feet in one second, or 1.46 feet in one 30 Hz TV frame. For accurate object recognition not only must the separation between the sensor and video camera be considered, so to must the effective exposure time, or integration period of the camera in order to avoid blurring of the video image.

Motion detector 100 is connected to a control unit 200 via a coupling 10 which may comprise a cable, an optical fiber or a wireless means such as a modulated or continuous wave RF or IR emission. The choice of coupling may be determined by the surveillance location, separation between the detector and control unit, the ease of cable installation and availability of power. Control unit 200 receives the motion indicative signal from the motion detector, and generates in response, signals for coupling, via connection 20, to control the video recording camera 300.

Figure 4:
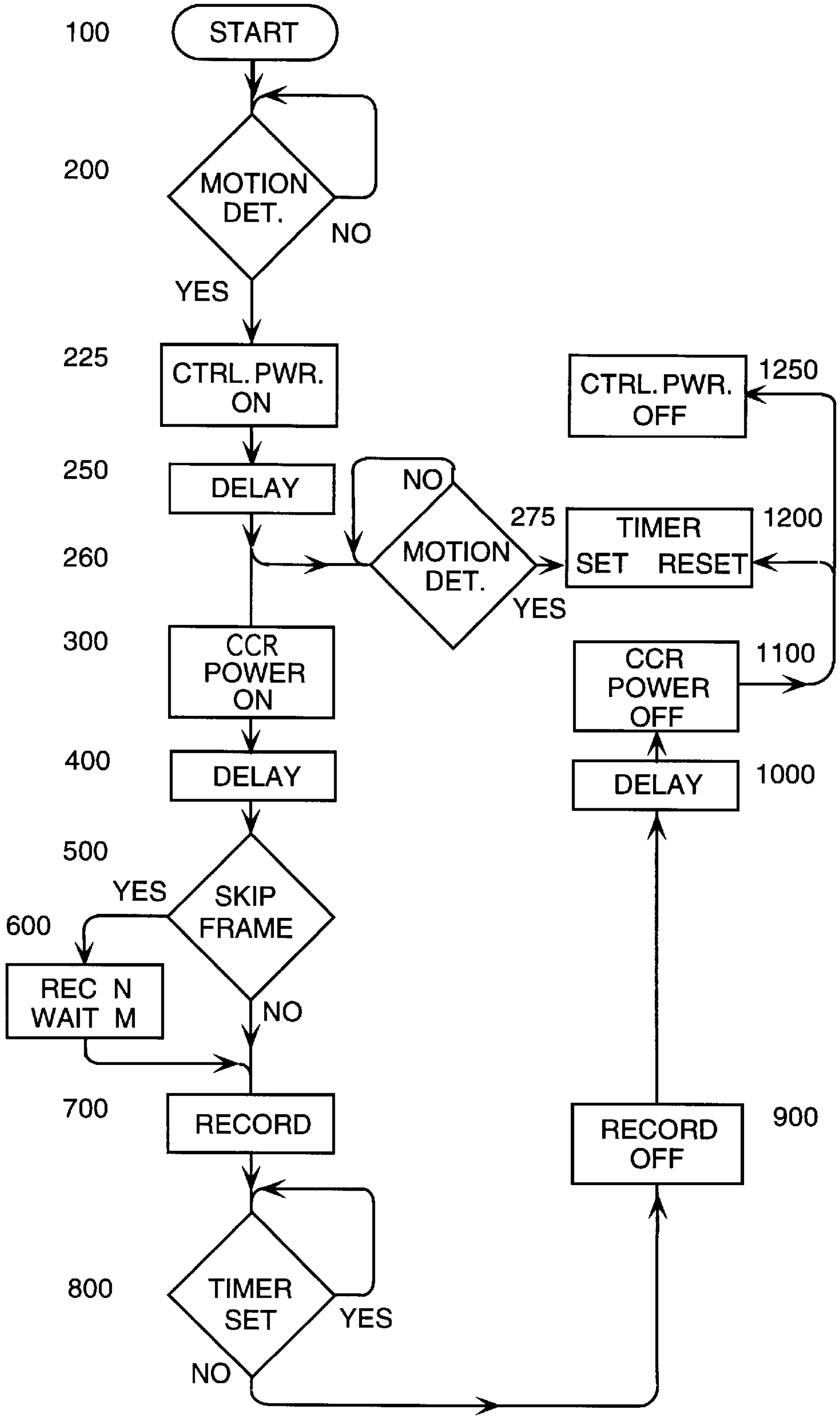
FIG. 4 is a flow chart depicting inventive control sequences.

To maximize operational flexibility the surveillance system may be battery powered to enable optimum equipment positioning without regard to AC power supply. In addition the system operating time on battery derived power must be maximized, thus requiring that power consumption be carefully controlled. The video recording device, for example a camcorder, may be advantageously controlled to minimize both battery power dissipation and recording media consumption. For example, FIG. 1C, 1D and 1E depict a battery powered detector controller 250, or detector transmitter 275, in which battery power consumption may be minimized by ensuring that only sensor 110 and detector 100 remain powered at all times. The control circuitry 200, IR control code generator 205 and IR transmitters may remain unpowered until motion is detected. With detected motion, battery power is applied and the exemplary control sequence of FIG. 4 is executed. The control sequence generates appropriate operating mode commands which may be translated into remote control codes for transmission to the exemplary camcorder by conductive or transmissive means, for example, cable, fiber, IR or RF transmission methods as previously described.

As described previously, a detector transmitter may be controlled remotely by means of an IR remote control. An IR remote control receiver, for example 115 of FIG. 1E receives IR command data to facilitate various user options. For example, the detector transmitter may be turned on or off, or more correctly, the IR sensor and motion detector may be turned off remotely. Under such conditions only the IR receiver is powered to enable reception of further remote commands. When the detector transmitter is on, or more correctly, the IR sensor and motion detector are on, the IR receiver is unpowered to reduce battery drain. IR remote control commands may be received by the detector transmitter during periods of detected motion immediately following transmission of motion responsive control signals, for example CIR 1 - 4. The user IR remote control data is not received and actioned the detector transmitter until the user's presence is detected and recorded. To further minimize battery dissipation the detector transmitter may employ a low power timer or clock which activates the detector transmitter at user selectable times, for example during lunch breaks, over night or at weekends.

To minimize both power dissipation and recording media consumption, the video recording device, for example a camcorder, may be powered down until motion is detected. Upon detecting motion power is applied, and recording initiated. Thus the recording media is only used when motion is detected. Such motion controlled recording prevents media wastage on static, immobile shots, which result from uncontrolled recording. To further conserve media consumption, the recorder may be controlled to record only predetermined video frames. Thus, by reducing the number of frames recorded per second the recording media consumption may be considerably extended. For example, by recording three frames per second the recordable duration of any media is multiplied by about ten times. However, with a tape based recording media system, the selected video frames must be recorded contiguously to enable subsequent reproduction. Hence the recorder and media transport may be require to stop, reverse and possibly erase to facilitate overwriting of non-required video frames. Thus in a tape media recording system the predetermined selection of recorded frames may be limited by the mechanical nature of the media transport. In non-tape recording systems a greater choice of recorded frame rates may be provided for discontinuous event recording. However the selection of greater gaps between recorded frames may depend on the motion rate within the field of view. For example, human motion may be adequately captured three times per second, however imaging a moving tennis ball 30 times per second may fail to reveal its actual point of impact, in or out of court.

An exemplary flow chart is shown in FIG. 4, illustrating an inventive control sequence executed by control unit 200, in response to a detected motion signal from detector 100. The control sequence starts at step 100. At step 200 a test is performed to determine if motion has been detected. A NO at step 200 results in a loop which waits for detected motion. A YES at step 200, activates at step 225, power to control logic circuitry, control code generation and transmission circuitry. Power is sustained until turned off by a power off command at step 1250. Following control power activation, a delay of, for example 100 msec., is applied at step 250 which provides for control circuitry stabilization. Following delay step 250, the sequence divides into two branches. A first branch retests for detected motion at step 260. If step 260 tests NO a loop is formed. A YES, at step 260, sets a timer or counter at step 275, which effectively provides a time out or monostable effect. The timer/counter is held set for the duration of the YES at step 260 and is unable to initiate counting or timing until the YES at step 200 is removed. Thus when detected motion ceases step 200 becomes NO, step 260 allows timer/counter 275 to initiate a predetermined count or time out interval, for example 10 seconds. At the end of the time out interval timer/counter assumes a quiescent state and waits for the next occurrence of motion. The time out interval provides hysteresis to prevent multiple system triggers in the event that object motion is intermittently detected. The second control branch from step 250, is applied at step 300 to activate video recording camera power. Control step 400 provides a delay to enable circuitry within the video recording camera to achieve operational stability. The delay may represent between one half 30 second to three seconds depending on the video recording camera type, and the actual status of the device, i.e. whether OFF or in a quiescent, low power dissipating condition with the tape threaded.

Following the delay at step 400, a test is performed at step 500 to determine whether the recorder initiates a continuous record mode represented by NO, or whether the user has elected to reduce recording media consumption by selecting an intermittent recording option, as represented by YES. The intermittent recording option at step 600 may, for example, skip multiple frames of image video, where for example, frames 1, 10and 20 may be recorded each second, consecutively and contiguously on the recording medium. Thus, in this example the record value N represents 1 frame and the wait value M represents 9 frames. This exemplary recording pattern will produce an image rate of three frames per second, which may be quite adequate for an indoor sales surveillance application but may, for example, be unsuitable where high rates of object motion are encountered. When the contiguous recording is replayed at a normal speed, the 3 frames per second image recording rate will be displayed with an effective rate of ten times actual speed. Determination of activity or object motion within each recorded frame may be achieved by recorder reproduction, and possibly the use of still or slow motion replay modes. Clearly other intermittent recording patterns are possible however the selection of frame rates achievable may be limited by the recorder mechanism and the requirement that the individual frames be recorded contiguously on the medium.

At step 700 the record mode is initiated either by NO from step 500 which initiates a continuous record, or the intermittent record command from step 600. Following the initiation of recording, a test is performed at step 800 to determine if timer is SET. If step 800 tests YES a loop is formed and the recording mode is sustained. Step 800 will test NO following cessation of detected motion and at the termination of the timer period, for example 10 seconds. Thus, when timer has timed out, following the ending of motion, the recording mode is terminated at step 900, record off.

Following the termination of the record mode a delay is instituted at step 1000 having a period of sufficient duration to allow the orderly termination of recording. For example, the recorder may reverse the media transport direction by a few recorded frames in order to provide for a contiguous recording when next activated. At step 1100 the recording video camera assumes the power off state. At step 1200 timer is reset. It is a timer reset condition which terminates the record mode at step 800, however, to remove the possibility of motion reoccurring during the period of delay 1000, the timer is forced into a reset condition at step 1200. Following timer reset, the control sequence, at step 1250, turns off control power and resumes waiting for further detected motion, at step 200.

The exemplary sequence of steps depicted in FIG. 4 may be implemented by a software algorithm executed, for example, by a microprocessor system. Alternatively the sequence of depicted in FIG. 4 may be realized by the use of electronic circuitry or "hardware". FIG. 5 shows a block diagram of a digital circuit embodiment which illustrates generation of parts of the control sequence charted in FIG. 4.

Figure 6:
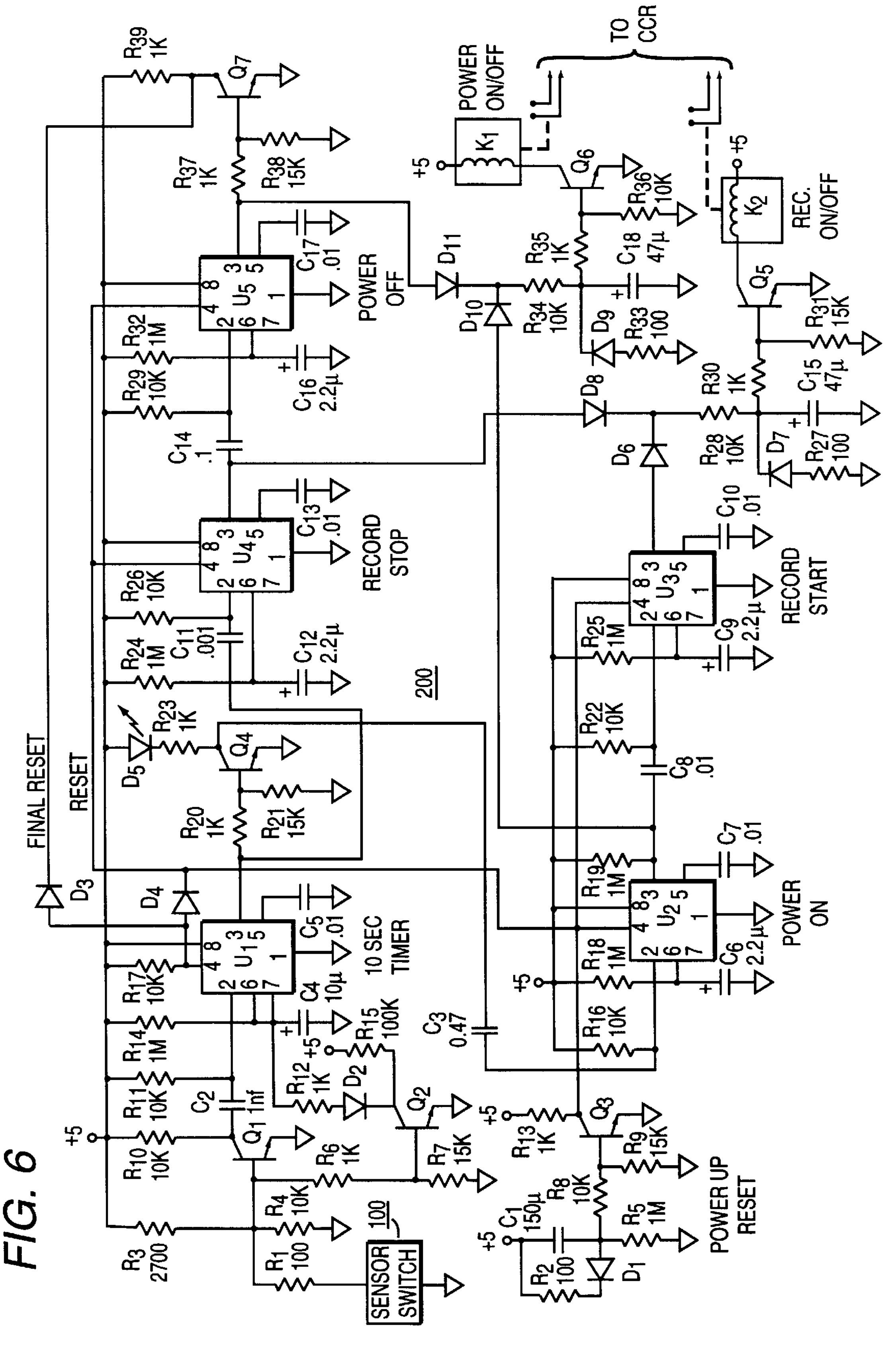
FIG. 6 is a circuit diagram of a controller for generating inventive control sequences.

The control sequence charted by FIG. 4 may be implemented by the exemplary control circuit depicted as elements 100 and 200 in FIG. 1A and illustrated as an electronic circuit in FIG. 6. The control circuit of FIG. 6 generates various pulse waveform signals illustrated in FIGS. 6B–6J, and operates as follows. Motion detector 100 detects an infrared emission MIR, generated by a warm, or warmer than ambient temperature, moving object within the sensor's field of view 50. Detector 100 generates a pulse waveform, depicted in FIG. 6B, which triggers integrated circuit timer U1, for example, type TLC555. Timer U1 generates a pulse waveform having a period approximately 10 seconds, as depicted in FIG. 6C. An output waveform of timer U1 is inverted by a transistor Q4 which is coupled to trigger a second integrated circuit timer U2, having a period of nominally 1.5 seconds, as depicted in FIG. 6D. An output of integrated circuit U2 is coupled to a base electrode of relay driver transistor Q6, via a delay network formed by resistor R34 and capacitor C18 which provides a delay of approximately 200 mille seconds. Transistor Q6 energizes a relay K1, closing a set of contacts for the duration of the period of IC. U2, nominally 1.5 seconds. Relay K1 selects a power on mode for a recording camera CCR, as is depicted in FIG. 6H. The power on mode remains selected, or latched, within the camcorder until relay KI contacts are closed again which unlatches the power on mode in the camcorder and powers the camcorder down.

The output of integrated circuit U2 is also coupled to a third integrated circuit timer U3 having a period of nominally 1.5seconds, as shown in FIG. 6E. An output of integrated circuit U3 is coupled to a base electrode of a relay driver transistor Q5 via a delay network formed by resistor R28 and capacitor C15 which provides a delay of approximately 200 milleseconds. Transistor Q5 energizes a relay K2 for the duration of timer U3, shown in FIG. 61, and selects a camcorder recording mode. Camcorder CCR remains in the recording mode until relay K2 is energized for a second time. The simultaneous selection of power on and recording modes is undesirable and may occur at the trailing edge of the output of IC U2 and the rising edge of the pulse output of IC U3. The possibility of control command overlap is prevented by the inclusion of the delay formed by resistor R28 and capacitor C15, charted as step 400 in FIG. 4, and coupled to the base of relay driver transistor Q5. The effect of the delaying capacitor results in a slowing of pulse rise time and a delay of approximately 200 milliseconds in the activation of relay K2.

When detected motion ceases, the output of sensor 100 changes state, causing transistor Q2 to discharge timing capacitor C4. Discharging timing capacitor C4 results in the retrigger of timer U1 which operates for a further timed period of, for example, ten seconds. This retriggering provides hysteresis which prevents rapid multiple triggering of the camcorder during periods of intermittent or obscured motion within the detector field of view. In addition timer U1 provides an exemplary minimum recorded duration of ten seconds for any detected event. The output of timer IC U1 is also coupled to a fourth timer IC U4, which generates a recording stop pulse, shown in FIG. 6F. The output from IC U4 is coupled via the delay network to energize relay drive transistor Q5 and relay K2. Relay K2 is energized for approximately 1.5 sec. as shown in FIG. 6I, which terminates camcorder record mode and selects a record pause mode. The output of timer IC U4, is also coupled to a fifth timer IC U5, having a period of about 1.5 sec. The output of timer IC U5, shown in FIG. 6H, is coupled via the delay network to relay driver transistor Q6. Relay KI is pulsed or energized for about 1.5 sec., unlatching the power on mode and powering down the camcorder.

The output of timer IC U5, is also coupled to a transistor Q7 which is turned on by the output pulse as shown in FIG. 6J, causing a final reset line to be pulled low, via diode D3, resetting timer IC. U1. A power on reset circuit, which includes a transistor Q3, is coupled to reset all timer IC's by the application of a low level to each respective reset terminals.

The control functions generated by the exemplary circuitry of FIG. 6 may, with minor adaptation, be implemented to control the generation of IR coded control data for infrared, or UHF transmission. However, the use of IR coded control data together with the inherent multiple device control capability suggests that the control unit be microprocessor based and software controlled.

What is claimed is:

1. A surveillance system, comprising:
 - an infrared motion detector generating a signal indicative of detected motion;
 - an infrared signal reflecting surface for directing an incident infrared signal to said infrared motion detector;
 - a generator generating infrared remote control encoded data responsive to said signal indicative of detected motion;
 - an infrared emitter coupled to said generator for modulation by said infrared remote control encoded data; and,
 - a modulated infrared signal from said infrared emitter being directed to said infrared signal reflecting surface for transmission.

2. The surveillance system of claim 1, wherein said infrared signal reflecting surface has a generally parabolic shape.

3. The surveillance system of claim 1, wherein said infrared signal reflecting surface receives an incident infrared signal emanating multi-directionally about the reflector.

4. The surveillance system of claim 1, wherein said infrared signal reflecting surface transmits said modulated infrared signal multi-directionally about the reflector.

5. The surveillance system claim 1, additionally comprises a receiver for receiving an infrared remote control encoded data signal incident on said reflecting surface.

6. The surveillance system of claim 5, wherein said receiver is activated responsive to said signal indicative of detected motion.

7. The surveillance system of claim 6, wherein said receiver generates a control signal responsive to said infrared remote control encoded data signal.

8. The surveillance system of claim 7, wherein said control signal controls operation of said infrared motion detector.

9. The surveillance system of claim 1, additionally comprises an RF carrier generator modulated for transmission by said infrared remote control encoded data.

10. The surveillance system of claim 1, wherein said infrared signal reflecting surface is formed as an outer surface of a hollow cone.

11. The surveillance system of claim 10, wherein said outer surface of said hollow cone comprises a plurality of substantially parabolically shaped panels.

12. The surveillance system of claim 10, wherein said hollow cone is sealed at a smaller diameter end.

13. The surveillance system of claim 1, wherein said motion sensing control unit is covered by an infrared transparent container to provide disguise.

14. The surveillance system of claim 1, wherein an infrared sensor is positioned adjacent to said infrared signal reflecting surface to receive infrared emissions.

15. The surveillance system of claim 1, wherein an infrared emitter is positioned adjacent to said infrared signal reflecting surface for infrared transmission.

16. A surveillance system, comprising:

an infrared motion detector generating a signal indicative of detected motion;

an infrared signal reflecting surface for directing an incident infrared signal to said infrared motion detector;

a generator generating infrared remote control encoded data responsive to said signal indicative of detected motion;

an infrared emitter modulated by said infrared remote control encoded data and directed towards said infrared signal reflecting surface for transmission; and, an imaging means responsive to said transmitted modulated infrared signal.

17. A surveillance system, comprising:

an infrared signal reflecting surface for directing an incident infrared signal;

an infrared motion detector for receiving from said reflecting surface said incident infrared signal and generating a signal indicative of detected motion;

an infrared receiver activated responsive to said signal indicative of detected motion for receiving from said reflecting surface an incident infrared remote control encoded data signal specific to said receiver;

a generator generating remote control encoded data responsive to said signal indicative of detected motion;

an infrared emitter coupled to said generator for modulation by said remote control encoded data and emitting a modulated infrared signal directed to said infrared signal reflecting surface for transmission; and, said receiver generating a control signal for terminating motion detection by said infrared motion detector responsive to said receiver specific remote control encoded data signal.

18. A surveillance system, comprising:

an infrared signal reflecting surface for directing an incident infrared signal;

an infrared motion detector for receiving from said reflecting surface said incident infrared signal and generating a signal indicative of detected motion;

an infrared receiver activated responsive to said signal indicative of detected motion for receiving from said reflecting surface an incident infrared remote control encoded data signal specific to said receiver;

a generator generating remote control encoded data responsive to said signal indicative of detected motion;

an infrared emitter coupled to said generator for modulation by said remote control encoded data and emitting a modulated infrared signal directed to said infrared signal reflecting surface for transmission; and, said receiver generating a control signal for terminating power dissipation by said infrared motion detector responsive to said receiver specific remote control encoded data signal.

19.A surveillance system, comprising:

an infrared signal reflecting surface for directing an incident infrared signal;

an infrared motion detector for receiving from said reflecting surface said incident infrared signal and generating a signal indicative of detected motion;

an infrared receiver activated responsive to said signal indicative of detected motion for receiving from said reflecting surface an incident infrared remote control encoded data signal specific to said receiver;

a generator generating remote control encoded data responsive to said signal indicative of detected motion;

an infrared emitter coupled to said generator for modulation by said remote control encoded data and emitting a modulated infrared signal directed to said infrared signal reflecting surface for transmission; and, responsive to said receiver specific remote control encoded data signal, said receiver controllably terminating power dissipation by said surveillance system and sustaining receiver power dissipation.

20. A surveillance system, comprising:

an infrared motion detector generating a signal indicative of detected motion;

an infrared signal reflecting surface for directing an incident infrared signal to said infrared motion detector;

a generator generating infrared remote control encoded data responsive to said signal indicative of detected motion;

an imaging means responsive to a transmitted modulated infrared signal; and, a plurality of infrared emitters modulated by said infrared remote control encoded data and directed towards said infrared signal reflecting surface for transmitting said transmitted modulated infrared signal, wherein said infrared remote control encoded data modulates said plurality of infrared emitters in a predetermined sequence.

21. A surveillance system, comprising:

an infrared motion detector generating a signal indicative of detected motion;

an infrared signal reflecting surface for directing a n incident infrared signal to said infrared motion detector;

a generator generating infrared remote control encoded data responsive to said signal indicative of detected motion;

an imaging means responsive to a transmitted modulated infrared signal; and, a plurality of infrared emitters positioned adjacent said infrared signal reflecting surface and directed towards said infrared signal reflecting surface for transmitting said transmitted modulated infrared signal, said infrared remote control encoded data modulating said plurality of infrared emitters in a predetermined sequence for sequential transmission in a plurality of directions.

* * * * *